Patented Mar. 19, 1940

2,193,950

UNITED STATES PATENT OFFICE 2,193,950

IMPALPABLE SUGAR COMPOSITION AND METHOD OF PRODUCING SAME

Grover D. Turnbow, Oakland, Calif., assignor of one-half to C. E. Gray, Oakland, Calif.

No Drawing. Application January 4, 1937, Serial No. 119,043

15 Claims. (Cl. 99—136)

This invention relates to food products having a high sugar content, more especially a high milk sugar or lactose content, and to an improved method for preparing such products in a manner whereby they have a smooth consistency.

In the manufacture of food products, especially those having a high percentage of lactose or milk sugar, such as evaporated milk, condensed milk, and ice cream, the tendency is for the milk sugar to crystallize in particles of substantial size. On account of the insolubility and rather flavorless properties of milk sugar the crystals thus formed resemble sand, organoleptically, and are very objectionable. The same thing is true, only to a much lesser degree, with products containing high percentages of other sugars. Nevertheless, there are occasions where it is desirable to have certain food products having high percentages of other sugars in a smooth condition where the sugar while it is undissolved exists in very finely divided particles.

In the manufacture of ice cream, certain efforts have been made to increase the milk solids content and at the same time have the milk sugar present in an undissolved and impalpable condition. This has been accomplished through adding to the ice cream, especially during the process of freezing, a certain percentage of the milk solids in a powdered condition wherein the milk sugar so added existed in a very great number of very finely divided undissolved particles, and on account of being added to the ice cream when it had been reduced to a low temperature the milk sugar remained undissolved and acted as nuclei upon which other milk sugar in solution could build. This resulted in a product of smooth consistency due to the fact that a portion of the milk sugar while undissolved existed in impalpable condition.

The disadvantage with this former method is that the mixtures at all times must be kept at temperatures low enough to prevent the milk sugar from going into solution. In the preparation of ice cream and other products, this is a distinct disadvantage in that all of the constituents cannot be heated at one time as in the process of pasteurization.

Another effort has been made to produce ice cream having milk solids of such percentage as related to the water content that the product contained more milk sugar than the water could permanently carry in solution, and wherein the proteins were deflocculated or dispersed to a state greater than they existed in the untreated product, the object here being apparently to have the proteins in such condition as to obstruct the movement of the sugar solution during crystallization, thereby producing sugar crystals in impalpable condition. This procedure produces satisfactory results only under certain favorable conditions.

The present invention has for its object a substantial improvement over that which has been previously accomplished in that a superior product, wherein the sugar not in solution exists in an undissolved and impalpable condition, may be produced, and at the same time sugar crystals as nuclei are not necessary. With the present invention the procedure is to add to the mixture being treated nuclei of material other than the sugar or to develop in the mixture nuclei upon which the insoluble milk sugar will form. These nuclei of material other than the sugar are of such minute size and in such numbers that when the sugar finally goes out of solution it will exist in the finished material in an impalpable condition. The material either added or developed for nuclei is such that even with the formation of the sugar thereon it remains very finely divided or impalpable and is substantially insoluble regardless of the usual temperatures to which the product is exposed during processing operations. It therefore at once becomes obvious that with this plan ice cream mixtures, evaporated and condensed milk, candies, icings, and the like, may be heated as desired in the processing operations without the nuclei being unfavorably affected insofar as the final result is concerned.

In the preparation of ice cream, the preferred procedure is the creation of insoluble, impalpable nuclei particles by the destruction of the normal colloidal characteristics of the casein content to provide insoluble casein particles for the absorption or occlusion of impalpable lactose crystals, formation of which may be initiated by the presence of the same undissolved, impalpable casein particles. This process may be carried out by the use of any of the several suitable known casein coagulants, such as rennet or alcohol, or by the adidtion of bi-valent salts. However, the method found satisfactory and one most easily carried out by one skilled in the art is the addition of rennet (preferably rennet extract solution) to the casein-bearing product which is maintained at approximately 40 degrees centigrade, under certain favorable conditions, thoroughly agitated so as to insure complete and intimate mixing, and allowing the coagulating process to proceed to the optimum point which is the minimum necessary to form the insoluble and impalpable casein particle, care being exercised not to add sufficient enzyme to cause coagulation. It is desirable to carry the coagulation only to a point where the coagulated particles are microscopic in size. One method of adding the rennet product is to pass the heated casein-bearing product through a centrifugal pump, adding the enzyme solution slowly to the suction side of the pump, thus bringing the enzyme solution continuously and intimately in contact with the casein-bearing product to be treated. The product must be heated immediately thereafter to preferably 61 degrees centigrade to effectively destroy the enzyme. The product may then be desiccated or used in fluid form, as the purpose may require.

Similarly, the casein of milk, skim milk, or other fluid dairy product may be coagulated and rendered insoluble by the addition of suitable bivalent metallic salts, such as calcium lactate, a water suspension of which may be added to the milk to be treated in such quantity as to bring about the desired destruction of the normal colloidal characteristics of the casein. The quantity required may vary with the nature and molecular weight of the salt used and may easily be determined by a reaction of the finished product, or by microscopic examination. After such treatment, the treated product may be desiccated or used in fluid form, as the purpose may require.

As an example of the procedure for the addition of other nuclei material a preferred method employs precipitated calcium carbonate, a relatively insoluble, inert material which contributes the impalpable, undissolved material necessary to initiate the spontaneous precipitation of lactose crystals of impalpable size. Calcium carbonate is preferred as the agency because of its low cost and its flavorless nature. The amount of calcium carbonate required depends upon the composition of the mix and the percentage of lactose present. It has been found in practice that the quantity required in the total mixture is approximately five-tenths of one per cent in an average ice cream mix. In the production of condensed milk or evaporated milk, where the concentration is carried to a point where the amount of milk sugar is greater than can be permanently carried in solution, the procedure similar to that outlined for the production of ice cream and the like may be used; that is, the casein, for example, may be coagulated in the manner outlined, thereby furnishing nuclei for the development of numerous impalpable milk sugar crystals, and product of perfectly smooth consistency will be produced.

Likewise in the production of mixtures containing high percentages of sucrose or other sugars, certain candies, icings, et cetera, where it is desirable to have great smoothness in the finished product, nuclei of material other than the sugar, as casein in the form heretofore indicated, or milk containing such casein, may be used as one of the constituents. It is only necessary to supply minute nuclei in sufficient numbers to have the sugar crystallize in an undissolved and impalpable condition. The quantity of the nuclei required will depend upon the percentage of the sugar in the finished product as well as the water or moisture content. The quantity of nuclei necessary can readily be determined by trial.

What I claim is:

1. The process of producing a smooth consistency product as to its sugar content, said product having a greater percentage of sugar than can be permanently carried in solution and which percentage of sugar would normally produce sandiness, which consists in providing in the mixture a material other than the sugar in a finely divided condition and on which the sugar will crystallize, said material being in such condition as not to be unfavorably affected as to size and condition as minute undissolved particles by the processing operation, and in such quantity with respect to the sugar content of the mixture that each of said nuclei having sugar crystallized thereon remains of impalpable size whereby the smooth consistency of the product is maintained notwithstanding the crystallization of the excess sugar.

2. The process of producing a smooth consistency product as to its milk sugar content, said product having a greater percentage of milk sugar than can be permanently carried in solution and which percentage of sugar would normally produce sandiness, which consists in providing in the mixture a material other than the milk sugar in a finely divided condition and on which sugar crystals will form, said material being in such condition as not to be unfavorably affected as to size and condition as minute undissolved particles by the processing operation, and in such quantity with respect to the milk sugar content of the mixture that each of said nuclei having crystallized sugar particles thereon will be of impalpable size whereby the smooth consistency of the product is maintained notwithstanding the crystallization of the excess milk sugar.

3. The process of producing ice cream and the like of smooth consistency as to its milk sugar content, said ice cream having a greater percentage of milk sugar than can permanently be carried in solution and which percentage of sugar would normally produce sandiness, which consists in providing in the mixture a material other than the milk sugar in a finely divided condition and on which milk sugar crystals will form, said material being in such condition as not to be unfavorably affected as to size and condition as minute undissolved particles by the processing operation, and in such quantity relatively to the milk sugar content of the mixture that each of said nuclei having milk sugar particles thereon is of impalpable size whereby the smooth consistency of the ice cream is maintained notwithstanding the crystallization of the milk sugar.

4. The process of producing a product of smooth consistency as to its sugar content, said product having a greater percentage of sugar than can be permanently carried in solution and which percentage of sugar would normally produce sandiness, which consists in providing in the mixture a precipitated casein in a finely divided condition on which sugar crystals will be formed, said casein being in such condition as not to be unfavorably affected as to size and condition as minute undissolved particles by the processing operation, and in such quantity with respect to the sugar content of the mixture that particles of casein combined with the sugar particles are of impalpable size whereby the smooth consistency of the product is maintained notwithstanding the crystallization of the sugar.

5. The process of producing a product of smooth consistency as to its milk sugar content, said product having a greater percentage of milk sugar than can be permanently carried in solution and which percentage of sugar would normally produce sandiness, which consists in providing in the mixture a precipitated casein in a finely divided condition on which the milk sugar will crystalize, said casein being in such condition as not to be unfavorably affected as to size and condition as minute undissolved particles by the processing operation, and in such quantity with respect to the milk sugar content of the mixture as will furnish sufficient nuclei to develop combined casein and milk sugar of impalpable size whereby the smooth consistency of the product is maintained notwithstanding the crystallization of the milk sugar.

6. The process of producing a product of smooth consistency as to its sugar content, said product comprising a casein content and also having a greater percentage of sugar than can be permanently carried in solution and which percentage of sugar would normally produce sandiness, which consists in incorporating in the mixture a casein coagulating material and forming coagulated casein particles constituting nuclei on which sugar particles will crystallize, the individual casein particles with the sugar particles crystallized thereon being of impalpable size whereby the smooth consistency of the product is maintained notwithstanding crystallization of the excess sugar content.

7. The process of producing a product of smooth consistency as to its sugar content, said product containing casein and having a greater percentage of sugar than can be permanently carried in solution and which percentage of sugar would normally produce sandiness, which comprises the step of precipitating the casein to form casein particles on which sugar particles crystallize, the particles of combined casein and sugar being of impalpable size whereby the smooth consistency of the product will be maintained notwithstanding crystallization of the excess sugar.

8. A product containing sugar in an amount which would normally produce sandiness, said product being of smooth consistency as to its sugar content, a portion of said sugar being present in an undissolved condition, said undissolved particles of sugar existing on nuclei of material other than the sugar and said combined particles of undissolved sugar and said other material being of impalpable size whereby the smooth consistency of the product is maintained notwithstanding the presence therein of undissolved sugar.

9. A product containing milk sugar in an amount which would normally produce sandiness, said product being of smooth consistency as to its milk sugar content, a portion of said milk sugar being present in an undissolved condition, said undissolved particles of milk sugar existing on nuclei of material other than the milk sugar, the particles formed by the combination of said other material and undissolved sugar being of impalpable size whereby the smooth consistency of the product is maintained notwithstanding the presence therein of undissolved sugar.

10. Ice cream and the like containing sugar in an amount which would normally produce sandiness, said ice cream being of smooth consistency as to its sugar content, a portion of said sugar being present in an undissolved condition, said undissolved particles of sugar existing on nuclei of material other than the sugar, the particles formed by the combination of said other material and undissolved sugar being of impalpable size whereby the smooth consistency of the product is maintained notwithstanding the presence therein of undissolved sugar.

11. Ice cream and the like containing milk sugar in an amount which would normally produce sandiness, said ice cream being of smooth consistency as to its milk sugar content, a portion of said milk sugar being present in an undissolved condition, said undissolved particles of milk sugar existing on nuclei of material other than the milk sugar, the particles formed by the combination of said other material and undissolved sugar being of impalpable size whereby the smooth consistency of the product is maintained notwithstanding the presence therein of undissolved sugar.

12. A product containing sugar in an amount which would normally produce sandiness, said product being of smooth consistency as to its sugar content, a portion of said sugar being present in an undissolved condition, said undissolved particles of sugar existing on nuclei of precipitated casein, the particles formed by the combined casein and sugar being of impalpable size whereby the smooth consistency of the product is maintained notwithstanding the presence therein of undissolved sugar.

13. A product containing milk sugar in an amount which would normally produce sandiness, said product being of smooth consistency as to its milk sugar content, a portion of said milk sugar being present in an undissolved condition, said undissolved particles of milk sugar existing on nuclei of precipitated casein, and the particles formed by the combined casein and sugar being of impalpable size whereby the smooth consistency of the product is maintained notwithstanding the presence therein of undissolved sugar.

14. The process of producing a product of smooth consistency as to its sugar content, said product having a casein content and also having a greater percentage of sugar than can be carried in solution in the liquid content of the product and which percentage of sugar would normally produce sandiness, which consists in only partially coagulating the casein to precipitate the same, the partially coagulated casein particles in their precipitated condition constituting nuclei on which sugar particles will crystallize, said precipitated casein particles being present in such quantity with respect to the sugar content of the mixture that each of said nuclei having crystallized sugar particles thereon will be of impalpable size whereby the smooth consistency of the product is maintained notwithstanding the crystallization of the excess sugar.

15. A product containing casein and sugar, the sugar being present in an amount which would normally produce sandiness, a portion of the sugar content being present in an undissolved condition and said product being of smooth consistency as to its entire sugar content, and at least a portion of the casein content being present in a partially coagulated precipitated state with the particles of precipitated casein combined with the undissolved sugar particles, the composite particles of casein and sugar being impalpable whereby the quality of smooth consistency is imparted to the product.

GROVER D. TURNBOW.